United States Patent [19]

Diepstraten

[11] Patent Number: 5,602,896
[45] Date of Patent: Feb. 11, 1997

[54] COMPOSING AN IMAGE FROM SUB-IMAGES

[75] Inventor: Leonardus J. M. Diepstraten, Eindhoven, Netherlands

[73] Assignee: U.S. Philips Corporation, New York, N.Y.

[21] Appl. No.: 571,483

[22] Filed: Dec. 13, 1995

[30]   Foreign Application Priority Data

Dec. 22, 1994 [EP]  European Pat. Off. ............ 94203723

[51] Int. Cl.$^6$ .................................................. H05G 1/64
[52] U.S. Cl. ............................. 378/98.7; 378/98.12
[58] Field of Search ........................ 378/98.2, 98, 98.7, 378/98.12

[56]   References Cited

U.S. PATENT DOCUMENTS 5,436,952  7/1995  Haendle et al. ...................... 378/98.7

FOREIGN PATENT DOCUMENTS 3315882  11/1984  Germany .

*Primary Examiner*—Don Wong
*Attorney, Agent, or Firm*—Jack D. Slobod

[57]   ABSTRACT

An image pick-up apparatus (1) comprises a plurality of image sensors (2, 3) for picking up sub-images and for supplying electronic sub-image signals. A combination unit (4) forms an electronic image signal for a composite image from the sub-image signals. The image pick-up apparatus also comprises a correction unit (5) for compensating differences in the electronic sub-image signals which are not related to image information per se. To this end, the correction unit (5) multiplies brightness values of a first sub-image per image column and brightness values of a second sub-image per image line. Suitable gain factors are iteratively determined, using a bisection method, from the instantaneous image being picked up, or from a reference image, and are stored in a memory.

19 Claims, 3 Drawing Sheets

COMPOSING AN IMAGE FROM SUB-IMAGES

BACKGROUND OF THE INVENTION

The invention relates to an image pick-up apparatus, including a first and a second image sensor for converting a first and a second subimage into a first and a second electronic sub-image signal, respectively, and also a combination unit for deriving an electronic image signal for a composite image from the first and second electronic sub-image signals. The invention also relates to an X-ray examination apparatus including an X-ray source for irradiating an object by means of an X-ray beam in order to form an X-ray image, an X-ray detector for deriving an optical image from the X-ray image, and an image splitter for deriving a first and a second sub-image from the optical image. The invention also relates to a method of composing a composite image from a first sub-image picked up by a first image sensor and a second sub-image picked up by a second image sensor.

2. Description of the Related Art

An image pick-up apparatus and a method of this kind are known from German Offenlegungsschrift DE 33 15 882.

The known image pick-up apparatus forms part of an X-ray examination apparatus. The X-ray examination apparatus comprises an X-ray source and an X-ray image intensifier whereto the image pick-up apparatus is optically coupled. An X-ray image is formed of an object, for example a patient to be radiologically examined, arranged between the X-ray source and the X-ray image intensifier, by irradiating the object by means of an X-ray beam emitted by the X-ray source. The X-ray image is formed on an entrance screen of the X-ray image intensifier and converted into an optical image on an exit window of the X-ray image intensifier. The optical image is picked up by the image pick-up apparatus and converted into an electronic image signal.

The known image pick-up apparatus comprises two solid-state image sensors, each of which comprises a plurality of photosensitive elements. The image sensors are arranged in such a manner that pixels of the optical image which are picked up by one image sensor are situated in the intermediate spaces between the photosensitive elements of the other sensor. Each image sensor picks up a respective sub-image and applies a respective sub-image signal to the combination unit which forms an image signal for the composite image from said sub-image signals. The composite image is composed of image lines of the sub-images picked up by the individual sensors, i.e. so that image lines of one image sensor constitute the odd image lines in the composite image and image lines of the other image sensor constitute the even image lines in the composite image. In the direction transversely of the image lines the composite image has a spatial resolution which has approximately been doubled relative to the sub-images picked up by the individual sensors.

The known image pick-up apparatus has a drawback in that, even when the optical image is of uniform brightness, image lines from different image sensors may have different brightness values in the composite image. The differences may be due inter alia to the fact that the individual image sensors receive light from the exit window via different optical paths in which differences in light attenuation occur and/or that the sensitivities of the image sensors are not exactly equal. Such differences cause disturbances in the composite image. The composite image may exhibit, for example a streaky pattern which is not at all related to the image information in the optical image but is caused by unequal sensitivities of the image sensors.

The light beam emitted by the exit window is split into two sub-beams by a partly transparent reflector. Because the degree of transmission and reflection of this reflector is dependent on the angle of incidence of the incident light, a light intensity variation occurs within the sub-beams if different angles of incidence occur in the light beam. The image sensors convert this light intensity variation into variations of the brightness values in the sub-image signals. These variations in brightness values differ for the various sub-image signals and, if no further steps are taken, said different variations cause complex disturbances in the composite image. Such disturbances further degrade the image quality of the composite image. The disturbances are notably detrimental to the diagnostic quality of the composite image, because small details in the X-ray image may be lost in the complex brightness variations of the disturbances in the composite image. Particularly these small details in the X-ray image, however, may be of prime importance in establishing a correct diagnosis.

It is an object of the invention to provide an image pick-up apparatus enabling correction of variations of brightness values of the sub-images in order to counteract disturbances in the composite image.

To achieve this, a method in accordance with the invention is characterized in that the image pick-up apparatus comprises a correction unit for correcting brightness values, comprising a multiplier for multiplying brightness values of an image column of the first sub-image by a column gain factor and brightness values of an image line of the second sub-image by a line gain factor.

The image pick-up apparatus of the invention is intended notably for picking up sub-images, each of which consists of an image consisting of a raster of pixels. Pixels in one direction in the image constitute image lines and pixels in a direction transversely of the direction of the image lines constitute image columns. Each pixel thus forms part of one image line and one image column. The horizontal direction is customarily taken as the direction for the image lines and the vertical direction as the direction for the image columns, but this convention is not essential for the invention. In the scope of the present invention it is to be noted that, evidently, multiplication by a factor can be performed equally well by division by the reciprocal factor or by repeated addition.

In the composite image, composed by way of the corrected brightness values, the differences between brightness variations in the individual sub-images, in as far as these differences do not relate to image information, are compensated by a suitable choice of the values of column and line gain factors. As a result, disturbances in the composite image are counteracted and the diagnostic quality of the composite image is improved. When the invention is used in such a manner that the pixels of one sub-image are corrected per image line and those of the other sub-image per image column, comparatively few values will be required for these column and line gain factors, i.e. approximately the sum of the numbers of image lines and image columns, so that a memory of moderate capacity already suffices when predetermined column and line gain factors are stored. Even when separate sets of values of column and line gain factors are required for different circumstances in which an image is picked up, or separate settings of the image pick-up apparatus, the number of values is sufficiently limited so that it is practically feasible to fetch the values from a memory.

Because individual brightness values in the composite image need only be multiplied by a single column or line gain factor, an image pick-up apparatus in accordance with the invention requires only a single multiplier so as to form corrected brightness values.

It is another object of the invention to provide an X-ray examination apparatus for forming a composite image of high spatial resolution from sub-images derived from an X-ray image, said X-ray examination apparatus enabling correction of brightness values of the composite image in order to counteract disturbances in the composite image.

An X-ray examination apparatus comprising an X-ray source for irradiating an object by means of an X-ray beam in order to form an X-ray image, an X-ray detector for deriving an optical image from the X-ray image, and an image splitter for deriving a first and a second sub-image from the optical image, is characterized in accordance with the invention in that the X-ray examination apparatus comprises an image pick-up apparatus as claimed in claim 1 for deriving an electronic image signal of a composite image with corrected brightness values from the sub-images.

An X-ray examination apparatus provided with an image pick-up apparatus in accordance with the invention offers the advantage that an X-ray image is converted into an electronic image signal for a composite image of high diagnostic quality. Such high diagnostic quality is achieved in that the composite image has a high spatial resolution and contains few disturbances, so that small details of little contrast can be suitably reproduced, for example on a monitor. The radiologist can thus more readily notice small details, such as a tumor in an initial pathological stage.

The values of the column and line gain factors available are inter alia dependent on settings of the X-ray examination apparatus. These settings concern, for example the setting of the anode current and the high voltage of the X-ray source or the setting of a diaphragm for controlling the light intensity on the image sensors. In order to achieve accurate correction for various of such settings, a set of values for column and line gain factors is available for individual settings; for example, these sets of values are stored in a memory. Because only comparatively few column and gain factors, i.e. only approximately 2000, are required for a comparatively large composite image of approximately 1000×1000 pixels, sets of values for even numerous settings of the X-ray examination apparatus are available without requiring an excessively large and expensive memory.

It is another object of the invention to provide a method of forming a composite image from a first and a second sub-image and for supplying corrected brightness values for the composite image in order to counteract disturbances in the composite image.

A method of composing a composite image from a first sub-image picked up by a first image sensor and a second sub-image picked up by a second image sensor in accordance with the invention is characterized in that corrected brightness values are formed by multiplying brightness values of the first sub-image by a column gain factor which is variable per image column and by multiplying brightness values of the second sub-image by a line gain factor which is variable per image line, the composite image being formed by means of image lines with corrected brightness values of the first sub-image alternating with image lines with corrected brightness values of the second sub-image.

In order to counteract disturbances in the composite image, the column and line gain factors are determined so that the difference in the variation of the brightness in the individual sub-images is compensated in the composite image with corrected brightness values in as far as this difference does not relate to image information. Because individual brightness values need be multiplied by only a single column or line gain factor, the number of arithmetical operations is limited to a single multiplication per pixel, so that the method of the invention requires only little computing time.

A further preferred implementation of a method of the invention is characterized in that the column and line gain factors are derived from brightness values of a first and a second reference image picked up by the first image sensor and the second image sensor, respectively.

The values of column and line gain factors are essentially independent of the image information of the sub-images. Consequently, the values of column and line gain factors can be derived from the reference images so as to be stored in a memory. The values stored are then available to execute the multiplications of brightness values at a later instant. A single first and second reference image suffice to determine column and line gain factors for the correction of brightness values of many different composite images. The reference images may be special-purpose images wherefrom column and line gain factors are derived whereby accurately corrected composite images can be obtained in many different circumstances. The first and second reference images may furthermore be images containing the same image information.

A further preferred implementation of a method in accordance with the invention is characterized in that column gain factors for individual image columns are formed as the quotient of mean brightnesses in corresponding image columns in the first reference image and the second reference image, respectively, line gain factors for individual image lines being formed as the quotient of mean brightnesses in corresponding image lines in the second reference image and the first reference image, respectively.

Corresponding image lines and columns are to be understood to mean image lines and columns which contain substantially the same image information. When the composite image is formed by image lines of the first sub-image alternating with image lines of the second sub-image, a pair of corresponding image columns of the first and the second sub-image together constitute an image column of the composite image. A pair of corresponding image lines of the first and the second sub-image then constitute neighbouring image lines in the composite image. Because the column and line gain factors are derived from mean values of brightness values, the effect of noise is reduced. Such a mean value may be the sum of a number of brightness values, divided by their number or not, or also a weighted mean value.

A further preferred implementation of a method in accordance with the invention is characterized in that the column and/or line gain factors are derived from said mean brightness values by means of a bisection method.

The bisection method for determining the column gain factor for one of the image columns in the composite image involves determination of the difference between a first and a second mean value of the brightness in an image column of the first and the second image, respectively. Subsequently, a random first gain value is chosen whereby brightness values of the second sub-image are multiplied, the second mean value being subsequently determined therefrom. Subsequently, the sign of the difference between the first and the second mean values is determined. A second gain value is then searched, for example by trial and error, the sign of the difference between the first and the second mean values opposing that of the first gain value. Subsequently, for a third gain value, being between the first and the second gain value, the sign of the difference between the first and the second mean values is determined again. Subsequently, a fourth gain value is determined which is between the first and the third gain value or between the third and the second gain value, depending on the sign of the third gain value. By iteration, therefore, the gain value is found for which the difference between the first and the second mean value substantially disappears; this gain value is the column gain factor searched. The same bisection method, be it applied to the difference between mean brightness values of image lines of the first and the second sub-image and on the basis of amplification of brightness values of the first sub-image, produces the line gain factor searched for one of the image lines in the composite image.

An advantage of this bisection method consists in that only a small number of simple arithmetical operations is required for accurate determination of the column and line gain factors searched. Furthermore, no separate, complex control system is required for keeping the amplifiers accurately adjusted to required absolute gain factors.

A further preferred implementation of a method in accordance with the invention is characterized in that said column and line gain factors are stored in a memory and said column and line gain factors are fetched from the memory for the correction of brightness values of the first and the second sub-image.

The method of the invention for the correction of brightness values requires no more values for column and line gain factors than the sum of the numbers of image lines and image columns of a sub-image. As the number of pixels in the composite image increases, the number of values required, therefore, increases only slowly, i.e. approximately as the square root. When the values for the column and line gain factors are stored in a memory, a comparatively small memory capacity already suffices even for large composite images. For example, a memory capacity amounting to a few thousands of values suffices for a composite image comprising millions of pixels. Because only a comparatively small number of column and line gain factors need be fetched, the method takes little time even in the case of a large composite image.

A further preferred implementation of a method in accordance with the invention is characterized in that the first and second sub-images are used as the first and the second reference image, respectively, for calculation of the column and line gain factors, the column and line gain factors being calculated from brightness values of the first and a second sub-image. It is also possible to use the individual sub-images themselves, as picked up by the individual image sensors, as reference images. The correction of brightness values for the composite image is then very accurate for individual circumstances in which sub-images are picked up and processed so as to form a composite image, because the values thus determined provide optimum correction which is specific of the instantaneous sub-images.

Because column and line gain factors need be determined again for each subsequent composite image, more arithmetical operations are then required than when the column and line gain factors are derived from separate reference images.

These and other aspects of the invention will be apparent from and elucidated with reference to the embodiments and implementations described hereinafter and with reference to the accompanying drawing.

DETAILED DESCRIPTION OF THE PREFERRED EMBODIMENTS

Figure 1:
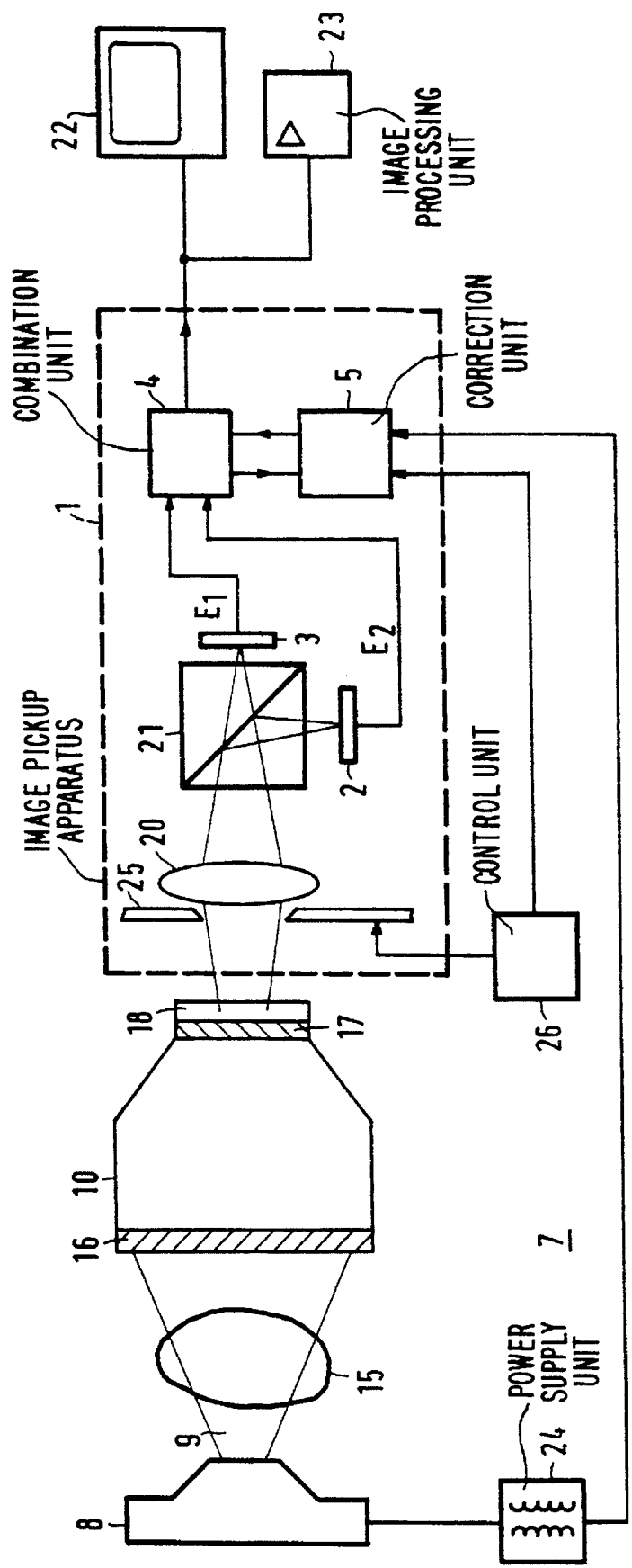
FIG. 1 shows diagrammatically an X-ray examination apparatus comprising an image pick-up apparatus in accordance with the invention.

FIG. 1 shows diagrammatically an X-ray examination apparatus 7, comprising an image pick-up apparatus 1 in accordance with the invention. In order to form an X-ray image of a patient 15, the patient is irradiated by means of an X-ray beam 9 from an X-ray source 8. The X-ray image is formed on an entrance screen 16 of an X-ray image intensifier 10 and converted into an optical image on a phosphor layer 17 provided on an exit window 18. The image pick-up apparatus 1 comprises a camera lens 20 which, in conjunction with a beam splitter 21, focuses the light from the exit window onto two image sensors 2, 3. The image sensors are, for example CCD sensors comprising a large number of photosensitive elements and are positioned relative to the beam splitter in such a manner that pixels in the optical image which are imaged on photosensitive elements of the one image sensor are imaged in intermediate spaces between photosensitive elements of the other image sensor. For example, the individual image sensors pick up alternating bands of the optical image. Each image sensor supplies an electronic sub-image signal which contains signal levels representing brightness values in the sub-images. The electronic sub-image signals are combined in a combinations unit 4 so as to form an electronic image signal whose signal levels represent brightness values for the composite image. A correction unit 5 corrects the electronic image signal for the composite image for differences between the signal levels of the individual image sensors, in as far as these differences do not relate, or hardly relate, to image information in the optical image. For the reproduction of image information of the optical image, the combination unit 4 applies the electronic image signal for the composite image to a monitor 22 or to an image processing unit 23 for further processing.

The X-ray source is driven by a high-voltage power supply 24. The energy and intensity of the X-rays emitted by the X-ray source can be adjusted on the basis of the setting of the high-voltage power supply 24. The light intensity of the light incident on the image sensors 2 and 3 can be controlled on the basis of the setting of the diaphragm aperture of a diaphragm 25 arranged in front of the camera lens 20. The diaphragm 25 is adjusted by means of a control unit 26. The correction unit 5 is coupled to the control unit 26 and to the high-voltage power supply 24 in order to supply column and line gain factors for different settings so as to form corrected brightness values for the composite image. The column and line gain factors are stored, for example as sets for different settings, in a memory unit of the correction unit, or can be calculated in dependence on the various settings by an arithmetic device of the correction unit.

Figure 2:
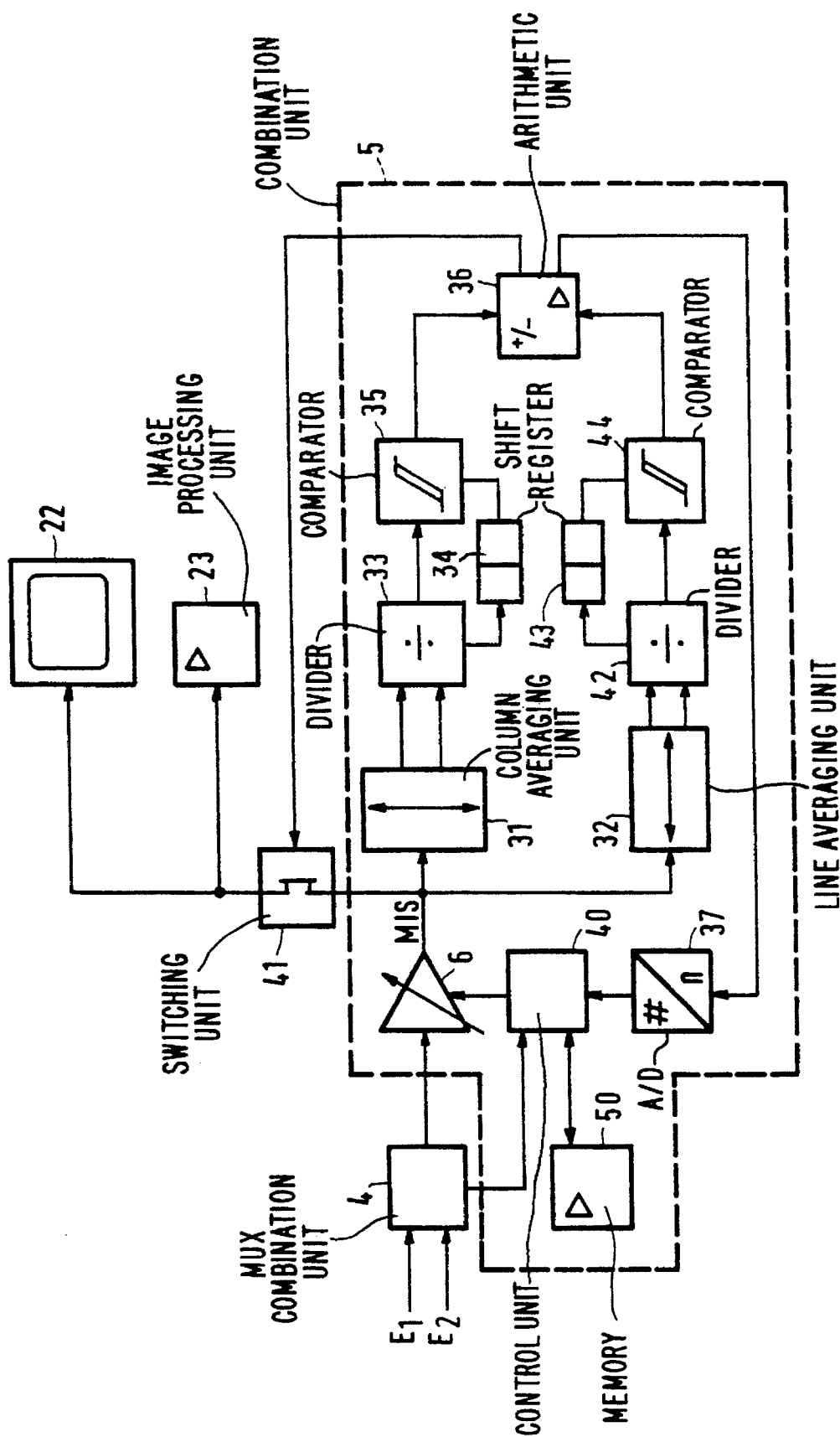
FIG. 2 shows diagrammatically an embodiment of a correction unit of an image pick-up apparatus in accordance with the invention.

FIG. 2 shows diagrammatically an embodiment of a correction unit of an image pick-up apparatus in accordance with the invention. The first electronic image signal $E_2$ and the second electronic image signal $E_1$, originating from the image sensors 2 and 3, respectively, are combined in a combination unit in the form of a multiplexer 4 so as to form an electronic multiplex image signal with alternating parts of the first and the second electronic image signals relating to different image lines in the sub-images. For example, the electronic multiplex image signal supplied by the multiplexer 4 comprises a signal part which relates to the first image line in the first sub-image, followed by a signal part which relates to the first image line in the second sub-image, followed by a signal part which relates to the second image line of the first sub-image, etc. The multiplexer 4 thus composes an electronic image signal for an image in which the odd image lines originate from the first sub-image and the even image lines originate from the second sub-image. An adjustable amplifier 6, acting as a multiplier, multiplies individual parts of the multiplex signal by column and line gain factors in order to form an electronic image signal for the composite image with corrected brightness values. The column and line gain factors can be fetched from a memory 50 or be calculated from the brightness values of the sub-images. The gain of the amplifier 6 is controlled by means of a control unit 40 which is coupled to the multiplexer 4 in order to ensure that different signal parts of the multiplex image signal can be individually amplified.

The correction unit 5 is arranged to derive the column and line gain factors from the amplified multiplex image signal MIS. The correction unit determines the column and line gain factors by iteration. The multiplex image signal can be retained in a buffer memory in the multiplexer while the column and line gain factors are being determined and can subsequently be corrected by said column and line gain factors. When a series of images is picked up, it is also possible to correct a multiplex image signal by means of column and line gain factors derived from preceding images. By performing the correction on the basis of preceding images when comparatively little difference exists between the image information of successive images, it is not necessary to retain the multiplex image signal temporarily. The amplifier 6 comprises an output which is coupled to a column averaging unit 31 and to a line averaging unit 32. For each image column in the composite image the column averaging unit 31 calculates two mean values of the signal levels in the amplified multiplex image signal MIS which relate to pixels in the same image column of the composite image, i.e. one mean value of signal levels of pixels originating from the first subimage and one mean value of signal levels of pixels originating from the second sub-image. The line averaging unit 32 calculates mean values of the signal levels of pixels of each of the individual image lines of the composite image. The column and line averaging units are arranged to determine said mean values from the multiplex image signal which alternately comprises signal parts of image lines of the individual, sub-images. To this end, the column and line averaging units are provided with, for example a large number of adders in which the sum of the brightness values in the various image lines and image columns of the sub-images is updated as the individual signal parts are applied to the column and line averaging units. A divider 33 calculates ratios of the two mean values for individual image columns of the composite image. More specifically, the divider 33 calculates for each column the column average of signal levels of the first sub-image, divided by the column average of signal levels of the second sub-image for the same image column. The quotient is applied to a shift register 34 which also receives the value of the same quotient calculated during the preceding iteration step. A comparator 35 determines the difference between the value of the quotient supplied by the divider 33 and the value of the quotient calculated during the preceding iteration step. An arithmetic unit 36 determines the sign of the difference and applies a sign signal to an analog-to-digital converter 37. The sign signal is dependent on whether the difference supplied by the comparator is positive or negative. A positive difference indicates that the gain factor whereto the amplifier 6 is adjusted causes larger undesirable signal differences between brightness values for the individual image lines in the composite image in comparison with the gain factor whereto the amplifier 6 was adjusted during the preceding iteration step. In such a case the arithmetic unit 36 supplies a sign signal so as to adjust the amplifier so that the value of the quotient supplied by the divider 33 is reduced. When the difference determined by the comparator 35 is negative, however, the arithmetic unit supplies a sign signal to increase the quotient supplied by the divider 33. If, within the accuracy limits of the correction unit 5, no difference exists between the quotients supplied by the divider 33 in individual iteration steps, the adjusted gain has the desired column gain factor. Prior to the start of the iteration, the shift register is initialized to the value 1, so that for the column gain factor whereto the amplifier is adjusted by the correction unit the differences between column average values of brightness values of the first and the second sub-image are just compensated; this means that the line gain factors compensate vignetting in the direction of the image lines. When the multiplexer 4 supplies the amplifier with a signal part relating to an image line of the second sub-image, the control unit 40 adjusts the amplifier 6 for brightness values of pixels represented by signal levels of the multiplex signal to the column gain factor of the image column of the relevant pixel in the composite image.

Using the line averaging unit 32, the divider 42, the shift register 43 and the comparator 44, the correction unit 5 provides the desired line gain factors for individual image line in the same way as described above for the column gain factors. The line gain factors compensate vignetting in the direction of the image columns.

When the amplifier 6 has been adjusted to the desired gain, i.e. to the column gain factor or to the line gain factor in dependence on whether the multiplexer 4 supplies a signal part relating to an image line of the first or the second sub-image, the arithmetic unit applies a switching signal to the switching unit 41 so as to close the switching unit so that the output of the amplifier 6 is connected to the monitor 22 or to the image processing unit 23. The switching unit 41 is, for example a transistor, in which case the switching signal is applied to the gate of the transistor in order to turn on the transistor. When the switching unit is closed, the amplifier 6 supplies the multiplex image signal amplified by the column or line gain factors and representing corrected brightness values in order to display the composite image without disturbances on the monitor or to process the corrected brightness values further in the image processing unit.

During successive iteration steps the control unit 40 adjusts the amplifier, on the basis of the sign signal, to successive gain factors which are selected preferably in conformity with a bisection method. The control unit is preferably a digital control unit and the sign signal from the arithmetic unit 36 is digitized by an analog-to-digital converter 37 in order to be applied to the digital control unit. By execution of the bisection method in a digital manner the number of iteration steps in which the searched column and line gain factors are reached is limited. For example, when the control unit has 256 (=$2^8$) different settings for the amplifier 6, no more than seven iteration steps will be required.

The values for the column and line gain factors calculated by the correction unit 5 can also be stored in a memory 50. The values stored can then be used when sub-images are composed for a next occasion, so that it is not necessary to calculate continuously new values for the column and line gain factors.

Figure 3:
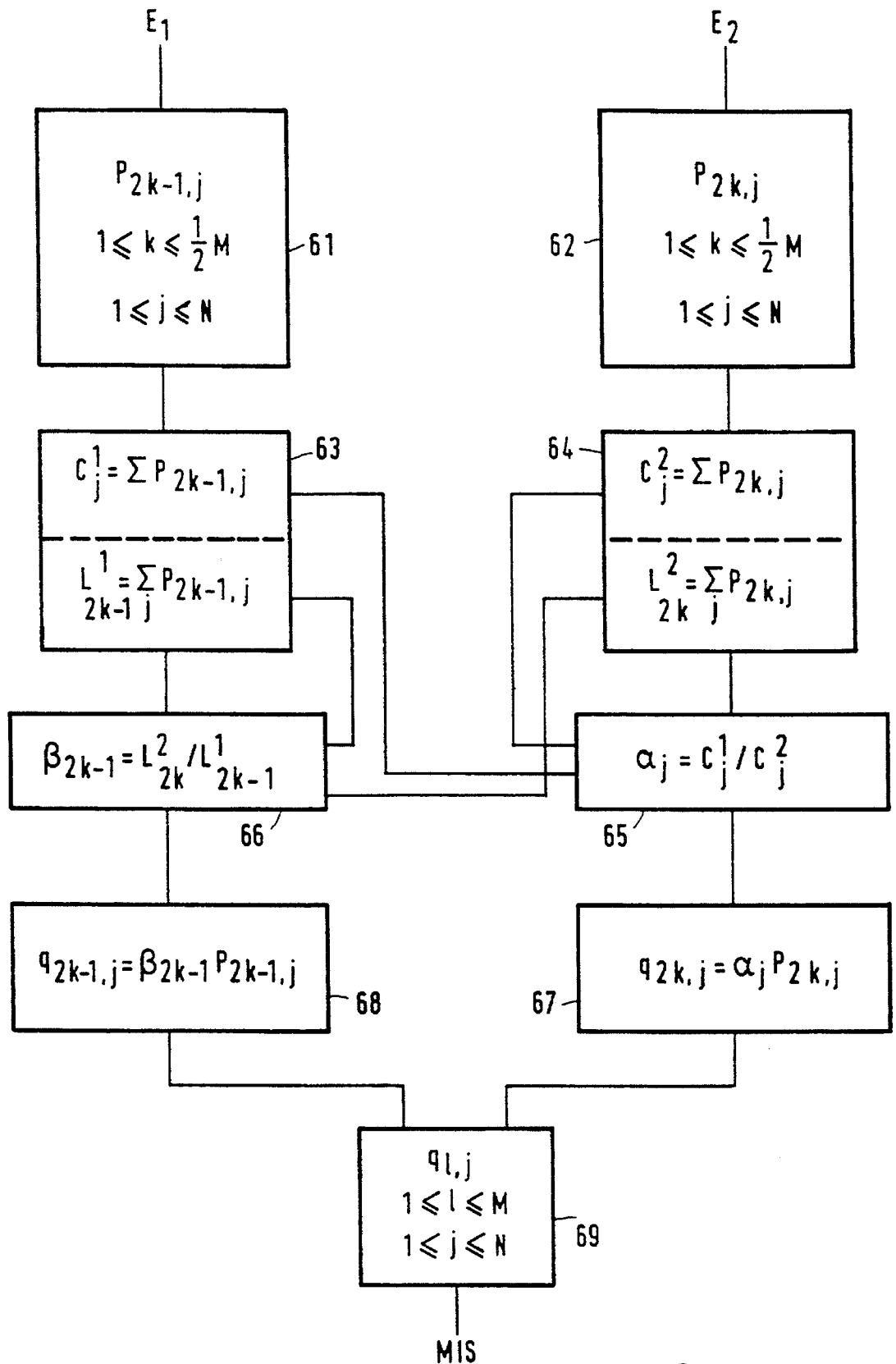
FIG. 3 shows a flow chart illustrating the method in accordance with the invention.

In an image pick-up apparatus in accordance with the invention, or in a contemporary X-ray examination apparatus comprising such an image pick-up apparatus, the functions of the correction unit can very well be implemented by means of a computer programmed for this purpose or by means of a special-purpose electronic processor. FIG. 3 shows a flow chart of the program steps executed while carrying out the method in accordance with the invention. By way of example, the situation will be described in which image lines of the first sub-image constitute the odd image lines of the composite image and image lines of the second sub-image constitute the even image lines thereof. The brightness values of pixels of the first sub-image are stored as brightness values $P_{2k-1,j}$ in block 61, for example in the form of signal levels of the image signal $E_1$ of the first sub-image. In block 62 brightness values of the second sub-image, for example in the form of signal levels of the image signal $E_2$, are stored as brightness values $P_{2k,j}$. The column index j successively assumes the values 1, 2 ... N, where N is the number of image columns in each sub-image and hence also the number of image columns in the composite image. The row index k successively assumes the values 1, 2 ... M/2, the number of image lines in each sub-image being M/2; the composite image then comprises an even number of M image lines. The brightness values in image columns of the first sub-image are added in block 63 so as to form first column sums $C^1_j = \Sigma_k p_{2k-1,j}$ and brightness values in image lines of the first sub-image are added so as to form first line sums $L^1_{2k-1} = \Sigma_j p_{2k-1,j}$. In block 64 brightness values of image columns of the second sub-image are added so as to form second column sums $C^2_j = \Sigma_k p_{2k,j}$ and brightness values in image lines are added so as to form second line sums $L^2_{2k} = \Sigma_j p_{2k,j}$. The first and second column sums are divided one by the other in block 65 so as to form the column gain factors $\alpha_j = C^1_j/C^2_j$. The second and first line sums are divided one by the other in block 66 so as to form the line gain factors $\beta_{2k-1} = L^2_{2k}/L^1_{2k-1}$. In block 67 corrected brightness values $q_{2k,j} = \alpha_j p_{2k,j}$ are formed for the even image lines of the composite image by multiplication of brightness values of image columns of the first subimage by column gain factors and in block 68 corrected brightness values $q_{2k-1,j} = \beta_{2k-1} p_{2k-1,j}$ are formed for the odd image lines of the composite image. The corrected brightness values $q_{ij}$ (l=1,2 ... M; j=1,2, ... N) are combined in block 69 so as to form a multiplex image signal of the composite image. The corrected brightness values $q_{ij}$ for the composite image are formed, as before, by multiplication of brightness values in the odd image lines by the column gain factors in dependence on the image column and, in dependence on the image line, by multiplication of brightness values in the even image lines by the line gain factors; thus, the transformation of brightness values of the sub-images into corrected brightness values of the composite image can be expressed as:

$$
\begin{array}{lll}
p_{1,1} & \cdots & p_{1,N} \\
p_{2,1} & \cdots & p_{2,N} \\
& \cdots & \\
p_{2k-1,1} & \cdots \ p_{2k-1,j} \cdots & p_{2k-1,N} \ \rightarrow \\
p_{2k,1} & \cdots \ p_{2k,j} \cdots & p_{2k,N} \\
& \cdots & \\
p_{M,1} & \cdots & p_{M,N}
\end{array}
$$

$$
\begin{array}{lll}
\beta_1 p_{1,1} & \cdots & \beta_1 p_{1,N} \\
\alpha_1 p_{2,1} & \cdots & \alpha_N p_{2,N} \\
& \cdots & \\
\beta_{2k-1} p_{2k-1,1} & \cdots \ \beta_{2k-1} p_{2k-1,j} \cdots & \beta_{2k-1} p_{2k-1,N} \ = \\
\alpha_1 p_{2k,1} & \cdots \ \alpha_j p_{2k,j} \cdots & \alpha_N p_{2k,N} \\
& \cdots & \\
\alpha_1 p_{M,1} & \cdots & \alpha_N p_{M,N}
\end{array}
$$

$$
\begin{array}{lll}
q_{1,1} & \cdots & q_{1,N} \\
q_{2,1} & \cdots & q_{2,N} \\
& \cdots & \\
q_{2k-1,1} & \cdots \ q_{2k-1,j} \cdots & q_{2k-1,N} \\
q_{2k,1} & \cdots \ q_{2k,j} \cdots & q_{2k,N} \\
& \cdots & \\
q_{M,1} & \cdots & q_{M,N}
\end{array}
$$

A difference between brightness variations in the sub-images in the column direction which do not relate to image information (vignetting difference in the image column direction) is compensated by multiplication by the line gain factors. Brightness values of the first sub-image are multiplied by line gain factors having the same value per image line. Brightness values of the second sub-image are multiplied by column gain factors which are variable per image column. The vignetting difference in the image line direction is compensated by multiplication by the column gain factors. In the example shown in FIG. 3, brightness values of the sub-images are first multiplied by column and line gain factors in order to form corrected brightness values which are combined so as to form a composite image; however, as is shown in FIG. 2, it is equally well possible to combine brightness values of the sub-images, followed by multiplication by column and line gain factors so as to form corrected brightness values of the combined image.

I claim:

1. An image pick-up apparatus comprising a first and a second image sensor (2, 3) for converting a first and a second sub image into a first and a second electronic sub-image signal, respectively, and a combination unit for deriving an electronic image signal for a composite image from said first and second electronic sub-image signals, characterized in that the image pick-up apparatus comprises a correction unit for correcting brightness values, comprising a multiplier for multiplying brightness values of an image column of the first sub-image by a column gain factor, and brightness values of an image line of the second sub-image by a line gain factor.

2. An X-ray examination apparatus, comprising an X-ray source (8) for irradiating an object by means of an X-ray beam in order to form an X-ray image, an X-ray detector for deriving an optical image from the X-ray image, and an image splitter for deriving a first and second sub-image from the optical image, said X-ray examination apparatus comprising an image pick-up apparatus for deriving an electronic image signal of a composite image with corrected brightness values from the sub-images, characterized in that said image pick-up apparatus comprises a first and a second image sensor for converting said first and second sub-image into a first and second electronic sub-image signal, respectively, a combination unit for deriving an electronic image signal for said composite image from said first and second electronic sub-image signals, and a correction unit for correcting brightness values, comprising a multiplier for multiplying brightness values of an image column of the first sub-image by a column gain factor, and brightness values of an image lines of the second sub-image by a line gain factor.

3. A method of composing a composite image from a first sub-image picked up by a first image sensor and a second sub-image picked up by a second image sensor, characterized in that corrected brightness values are formed—by multiplying brightness values of the first sub-image by a column gain factor which is variable per image column, and by multiplying brightness values of the second sub-image by a line gain factor which is variable per image line, the composite image being formed by means of image lines with corrected brightness values of the first sub-image alternating with image lines with corrected brightness values of the second sub-image.

4. A method as claimed in claim 3, characterized in that the column and line gain factors are derived from brightness values of a first and a second reference image picked up by the first image sensor and the second image sensor, respectively.

5. A method as claimed in claim 3, characterized in that column gain factors for individual image columns are formed as the quotient of mean brightnesses in corresponding image columns in the first reference image and the second reference image, and respectively, line gain factors for individual image lines are formed as the quotient of mean brightnesses in corresponding image lines in the second reference image and the first reference image, respectively.

6. A method as claimed in claim 5, characterized in that at least one of the column or line gain factors are derived from said mean brightness values by means of a bisection method.

7. A method as claimed in claim 3, characterized in that said column and line gain factors are stored in a memory, and said column and line gain factors are fetched from the memory for the correction of brightness values of the first and the second sub-image.

8. A method as claimed in claim 4, characterized in that the first and second sub-images are used as the first and the second reference image, respectively, for calculation of the column and line gain factors, and the column and line gain factors are calculated from brightness values of the first and a second sub-image.

9. A method as claimed in claim 4, characterized in that column gain factors for individual image columns are formed as the quotient of mean brightnesses in corresponding image columns in the first reference image and the second reference image, respectively, and line gain factors for individual image lines are formed as the quotient of mean brightnesses in corresponding image lines in the second reference image and the first reference image, respectively.

10. A method as claimed in claim 9, characterized in that at least one of the column or line gain factors are derived from said mean brightness values by means of a bisection method.

11. A method as claimed in claim 4, characterized in that said column and line gain factors are stored in a memory, and said column and line gain factors are fetched from the memory for the correction of brightness values of the first and the second sub-image.

12. A method as claimed in claim 5, characterized in that said column and line gain factors are stored in a memory, and said column and line gain factors are fetched from the memory for the correction of brightness values of the first and the second sub-image.

13. A method as claimed in claim 6, characterized in that said column and line gain factors are stored in a memory, and said column and line gain factors are fetched from the memory for the correction of brightness values of the first and the second sub-image.

14. A method as claimed in claim 9, characterized in that said column and line gain factors are stored in a memory, and said column and line gain factors are fetched from the memory for the correction of brightness values of the first and the second sub-image.

15. A method as claimed in claim 10, characterized in that said column and line gain factors are stored in a memory, and said column and line gain factors are fetched from the memory for the correction of brightness values of the first and the second sub-image.

16. A method as claimed in claim 5, characterized in that the first and second sub-images are used as the first and the second reference image, respectively, for calculation of the column and line gain factors, and the column and line gain factors are calculated from brightness values of the first and a second sub-image.

17. A method as claimed in claim 6, characterized in that the first and second sub-images are used as the first and the second reference image, respectively, for calculation of the column and line gain factors, and the column and line gain factors are calculated from brightness values of the first and a second sub-image.

18. A method as claimed in claim 9, characterized in that the first and second sub-images are used as the first and the second reference image, respectively, for calculation of the column and line gain factors, and the column and line gain factors are calculated from brightness values of the first and a second sub-image.

19. A method as claimed in claim 10, characterized in that the first and second sub-images are used as the first and the second reference image, respectively, for calculation of the column and line gain factors, and the column and line gain factors are calculated from brightness values of the first and a second sub-image.

* * * * *